United States Patent

[11] 3,540,551

[72] Inventor Bunji Ohshida,
 Kasukabe-shi, Japan
[21] Appl. No. 714,233
[22] Filed March 19, 1968
[45] Patented Nov. 17, 1970
[73] Assignee Shoketsu Kinzoku Kogyo Kabushiki Kaisha
 Tokyo, Japan
[32] Priority March 29, 1967
[33] Japan
[31] No. 42/25491

[54] OIL SUPPLYING APPARATUS WITH AN AUTOMATIC VARIABLE THROTTLE
 1 Claim, 5 Drawing Figs.
[52] U.S. Cl..................................................... 184/56;
 137/512.15
[51] Int. Cl..................................................... F16n 7/34
[50] Field of Search........................................... 184/56,
 56A, 59; 137/512.15

[56] References Cited
UNITED STATES PATENTS
1,306,391 6/1919 Romanoff..................... 137/512.15
2,613,067 10/1952 Goodyear..................... 184/56X
3,115,950 12/1963 Malec........................... 184/55
3,208,472 9/1965 Scaramucci................... 137/512.15X
3,244,257 4/1966 German et al. ............... 184/55
3,266,597 8/1966 Sochting et al. .............. 184/56
3,312,237 4/1967 Mon et al...................... 137/512.15

Primary Examiner—Manuel A. Antonakas
Attorney—McGlew and Toren

ABSTRACT: An oil supplying apparatus with an automatic variable throttle disposed within an air pipe passage, the throttle is made of elastic material such as synthetic rubber, etc. and is similar in shape to the section of the passage and utilizes the restoration character of its elastic material. By means of the throttle the opening in the air pipe passage is automatically changed corresponding to the quantity of air flow and thereby lubricant is dropped or supplied into the air flow from the time a comparatively small amount of air is flowing. Moreover, the concentration of lubricant in the flowing out air is made constant.

Patented Nov. 17, 1970
3,540,551
FIG. 1
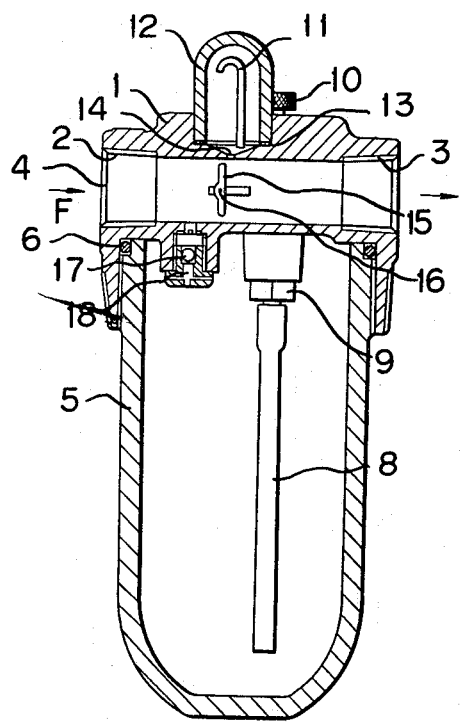
FIG. 2
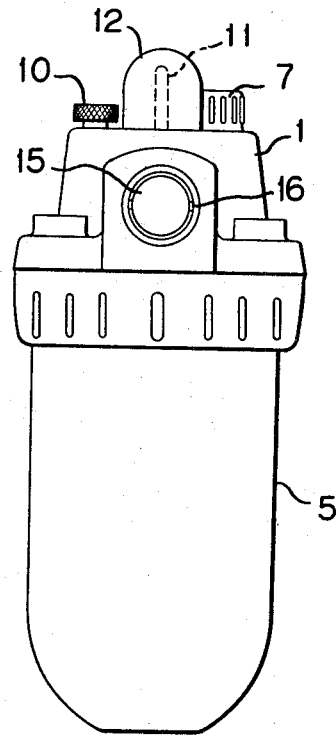
FIG. 3
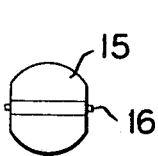
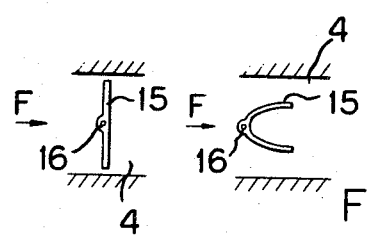
FIG.4A   FIG. 4B
INVENTOR.
BUNJI OHSHIDA
BY
Mean Glaw and Toren
attorneys

OIL SUPPLYING APPARATUS WITH AN AUTOMATIC VARIABLE THROTTLE

SUMMARY OF THE INVENTION

This invention relates to an oil supplying apparatus wherein an air pipe passage is fitted with an automatic variable throttle which is made of elastic material such as synthetic rubber, etc. and which is similar in shape to the section of the air pipe passage and the subject matter thereof resides in that a difference of pressure produced by air current between the upstream side and the downstream side of said automatic variable throttle, displaces the lubricant within the case, which is dropped under observation through a transparent dropping window. After that the lubricant is mixed in the air current by introducing it into the air pipe passage through a small hole provided at the downstream side of the automatic variable throttle and thus this oil is conveyed in a spray state.

According to such structure as this invention, as compared with the conventional oil supplying apparatus utilizing a difference of pressure and fixed throttle mechanism such as a venturi and others, a difference in pressure necessary for dropping lubricant can more easily be produced and in consequence, there are the advantages that the scope of the quantity of air current enabling to drop lubricant is wide and the amount of oil supplied is in proportion to the quantity of flow.

The objects and advantages of this invention will be explained by the embodiment shown in the drawings, in which:

FIG. 1 is a vertical sectional view of the apparatus according to this device;

FIG. 2 is a side view of FIG. 1;

FIG. 3 is a front view of the automatic variable throttle shown in FIGS. 1 and 2;

FIG. 4A is a side view showing the state of said variable throttle before deformation; and FIG. 4B is a side view showing the deformed state of said variable throttle.

Referring now to FIGS. 1 and 2, 1 denotes an upper cover, through the middle of which an air pipe passage 4 extends having a connecting screw portion 2, 3 at its both ends. A case 5 in which lubricant is stored is screwed into and connected to the upper cover 1 in an airtight manner by means of an O-ring 6. A plug 7 caps an oil supplying hole (not shown in the drawing) which is in communication with said case 5.

An oil introduction pipe 8 is connected to an oil introduction pipe nut 9 and the inside of pipe 8 and nut 9 serves as the passage for the lubricant. An open area of this passage is regulated by a needle valve 10 and this passage is in communication with a dropping pipe 11. A domelike body 12 made of transparent material serves as a dropping window, and said domelike body 12 is connected to said upper cover 1 by the interposition of a packing 13 and thereby is kept airtight.

At the lower part within this domelike body 12, a small hole 14, which communicates with the air pipe passage 4, is bored in the upper cover 1. An automatic variable throttle 15 according to this invention is positioned in the air pipe passage 4 and both ends of its support shaft 16 are held on the wall of the air pipe passage 4 at the upstream side against the air flow direction (arrow F) from said small hole 14.

In the air passage 4 on the upstream side of the automatic variable throttle a check ball mechanism, including a check ball 17, communicates with the interior of the case 5. When the oil supply plug is removed for supplying oil into the case 5, air is discharged from the case through the check ball mechanism so that oil flows into the case easily. When the plug 7 is inserted again the check ball mechanism closes the flow of air from the case, however, due to leakage around the check ball 17 the pressure in the case is equalized with that in the upstream side of the air pipe passage 4. The spring 18 retains the ball in position closing off flow through the mechanism.

When air streams past the automatic variable throttle 15, the pressure at its downstream side drops. Accordingly, a difference in pressure is established between the supply pressure within the case 5 and the small hole 14 thereby enabling lubricant, regulated by the needle valve 10, to drop into passage 4. The shape of the automatic variable throttle 15 is similar to the section of the air pipe passage 4 and since this throttle is made of elastic material such as synthetic rubber, etc., as the quantity of air flow increases, the state or shape of the throttle as shown in FIG. 4A is changed to the state illustrated in FIG. 4B and the air passage is enlarged as the automatic variable throttle 15 deforms in accordance with the quantity of air passing through the throttle. And when the flow quantity is decreased, the automatic variable throttle 15 is restored to the original state by its restoration force and in case a flow quantity is zero, a space between the throttle and the wall of the air pipe passage 4 is extremely small. Consequently, as compared with the conventional fixed throttle type oil supplying apparatus, the supply of lubricant exists from a comparatively small air flow quantity and therefore there is the effect that the scope of use of air flow quantity is enlarged. And the relation between a pressure drop and an air flow quantity due to the automatic variable throttle 15 is made so as to be nearly in linear proportion, so that the relation between the air flow quantity and the amount of lubricant supplied is also nearly in linear proportion and there is the effect that the concentration of lubricant in the air current flowing out from the apparatus of this device can be made constant corresponding to the variation of the air flow quantity.

I claim:

A lubricant supplying apparatus for introducing a regulated amount of a liquid lubricant into a gaseous medium comprising walls forming a closed chamber arranged to contain a supply of lubricant, a portion of said walls forming an airtight cover for said chamber, said cover having a laterally enclosed air flow passageway extending therethrough with an inlet at one end and an outlet at the opposite end, said air flow passageway having a smooth surface uninterrupted bore therethrough, an automatic variable throttle positioned within said passageway intermediate its inlet and outlet ends, said throttle positionable between a closed position disposed transversely across said passageway and a variable opened position, said throttle comprising a rigid support shaft extending transversely across and secured in position within said passageway and a thin disk shaped throttle member composed wholly of a flexible resilient elastic synthetic rubber material mounted on said shaft and having a shape and size generally conforming to the transverse shape and size of said bore formed in said air passageway so that in its closed position its peripheral edge is extremely closely spaced from the surface of said passageway and almost completely closes said passageway, and as air flows through said passageway from the inlet to the outlet thereof, said throttle member deflects in the downstream direction about said shaft due to its flexible elastic construction and provides a passageway opening in its opened position of variable cross section in direct relationship to the quantity of air flowing therethrough and when air flow through the passageway is discontinued said throttle member due to its resilient characteristic returns to its closed position, means arranged to supply lubricant from said chamber into said air flow passageway at a point located closely downstream in said air flow passageway from the closed position of said throttle member so that the air pressure at the downstream point is in communication with the lubricant in said chamber, said means arranged to supply lubricant comprising a lubricant introduction pipe and nut forming a partial passage from said chamber to the point located downstream of said throttle member, a needle valve located within the passageway formed by said pipe and nut for regulating flow of lubricant from said chamber into the air flow passageway, and a transparent dome mounted on said cover and arranged to receive the lubricant from said chamber before its introduction into said passageway, an opening in said cover communicating between said chamber and a point in said air flow passageway upstream from the closed position of said throttle member so that the body of lubricant within said chamber is in communication with said air passageway on the upstream side of the closed position of said throttle member whereby the body of the lubricant in said chamber is in lubrication with the pressure in said passageway on the upstream and downstream sides of said throttle member, wherein the flexible elastic characteristic of said throttle member is arranged to provide a nearly linear proportion between the quantity of air flow through said passageway and the pressure drop effected through said throttle member, whereby in response to the quantity of air flowing through said passageway said throttle member deflects from its closed position to an opened position relating to the quantity of air flow and establishes a lower pressure downstream of said throttle member as compared to the air pressure upstream from said throttle member so that a positive pressure difference exists between the interior of said chamber through the opening located upstream from said throttle member and the outlet of said means arranged to supply lubricant thereby causing lubricant to flow through said means from said chamber into said passageway.